United States Patent
Klein et al.

[11] 3,952,547
[45] Apr. 27, 1976

[54] METHOD AND MEANS FOR ACCURATELY ALIGNING THE AXES OF SHAFTS IN PUMP ASSEMBLIES OR THE LIKE

[75] Inventors: Johannes Klein, Frankenthal; Wolfgang Schneider, Hessheim; Karl Fetzer, Heidenheim, all of Germany

[73] Assignee: KSB Kernkraftwerkspumpen GmbH, Frankenthal, Germany

[22] Filed: Dec. 5, 1974

[21] Appl. No.: 530,043

[30] Foreign Application Priority Data
Dec. 10, 1973 Germany............................ 2361367

[52] U.S. Cl..................................... 64/9 R; 64/14
[51] Int. Cl.² ........................................... F16D 3/18
[58] Field of Search ............ 64/9, 14; 415/122, 201

[56] References Cited
UNITED STATES PATENTS

| | | | |
|---|---|---|---|
| 759,726 | 5/1904 | Maxim | 64/9 |
| 2,947,260 | 8/1960 | Hornschuch | 415/201 |
| 3,216,219 | 11/1965 | Hoglund | 64/9 |
| 3,557,574 | 1/1971 | Avery | 64/9 |
| 3,731,500 | 5/1973 | Schlums | 64/14 |
| 3,760,605 | 9/1973 | Schroder | 64/14 |

FOREIGN PATENTS OR APPLICATIONS
191,204   8/1957   Austria ..................................... 64/9

*Primary Examiner*—Henry F. Raduazo
*Attorney, Agent, or Firm*—Michael J. Striker

[57] ABSTRACT

The accuracy of axial alignment of rotary shafts which are connected to each other by face gears is determined by micrometer screws which are moved into contact with annular control surfaces of the shafts. The control surfaces are normal to the axes of the respective shafts and, if their planes are not exactly parallel to each other, selected teeth of the mating face gears are elastically deformed to a greater or lesser extent to thereby tilt at least one of the shafts with respect to the other shaft until the two axes are accurately aligned with each other. The elastic deformation of selected gear teeth can be effected by bolts and nuts which connect the two shafts and extend in parallelism with their axes or by a composite annular clamp whose arcuate sections engage tapering surfaces on the flanges of the shafts and are held together by bolts which can tilt the shafts relative to each other by changing the width of gaps between neighboring sections.

10 Claims, 3 Drawing Figures

METHOD AND MEANS FOR ACCURATELY ALIGNING THE AXES OF SHAFTS IN PUMP ASSEMBLIES OR THE LIKE

BACKGROUND OF THE INVENTION

The present invention relates to a method and means for accurately aligning the axes of two or more rotary parts, particularly to a method and means for accurately aligning the axes of shafts in pump assemblies for use in nuclear reactor plants.

It is known to drive the impeller of a centrifugal pump in a nuclear reactor plant by a motor through the medium of face gears which transmit torque from the motor shaft to the pump shaft. In such plants, the hydrodynamic or hydrostatic shaft seals which prevent escape or control the leakage of contaminated fluid from the pump body must be readily accessible for inspection, adjustment and/or replacement. The pump shaft rotates in one or more bearings which are lubricated by the circulating fluid, and the motor shaft rotates in one or more bearings which are lubricated by oil. The hydrodynamic or hydrostatic shaft seal is disposed between the two sets of bearings. If the motor shaft is integral with the pump shaft, the entire motor must be dismantled, with attendant substantial losses in time, whenever the attendants desire to gain access to the shaft seal.

In accordance with certain prior proposals one of which is disclosed in the commonly owned copending application Ser. No. 432,343 filed Jan. 10, 1974 by Peter Stech, the motor shaft transmits torque to the pump shaft through the medium of an intermediate shaft which is removable to afford convenient access to the shaft seal with greatly reduced losses in time. The intermediate shaft actually constitutes an extension of the pump shaft and is separably coupled thereto directly above the housing for the shaft seal. Once the intermediate shaft is removed, the attendants are in a position to reach not only the shaft seal but also the bearing or bearings for the pump shaft. An advantage of such pump assemblies is that the motor and the bearing or bearings for the motor shaft need not be dismantled or displaced at all.

However, the utilization of the just discussed intermediate shaft presents certain other problems, especially upon repeated removal and reinsertion of the intermediate shaft. Thus, it is difficult to move the axis of the reinserted intermediate shaft into exact alignment with the other two shafts so that the pump assembly exhibits a pronounced tendency to vibrate with attendant wear upon the bearings for the pump shaft and/or motor shaft. Moreover, pronounced vibrations reduce the effectiveness of the shaft seal so that the quantity of leak fluid increases; this is particularly undesirable when the leak fluid contains a radioactive substance. Attempts to reduce vibrations of a composite torque-transmitting connection between the motor and the impeller of the pump include the provision of a heat-shrunk connection (normally assisted by a key or tongue-and-groove joint) between separable portions of the motor shaft, between separable portions of the pump shaft or between the pump and motor shafts on the one hand and the intermediate shaft on the other hand. It was also proposed to pump oil or another liquid at a very high pressure between the neighboring flanges of cooperating shafts. Such techniques are not entirely satisfactory because they are not reproducible with a sufficient degree of accuracy. This is due to the fact that a connection which is obtained by heat-shrinking and/or by filling the joint with a highly pressurized liquid transmits torque by friction. When the joint is to be dismantled, the frictionally engaged parts undergo a pronounced deformation as a result of cooling or in response to a reduction of liquid pressure. Even minor deviations from the original degree of deformation (upon reestablishment of the joint by heat-shrinking or with a highly pressurized liquid) cause a pronounced wobbling and attendant vibrations with the aforediscussed adverse effects upon the shaft seal and bearings. The making of joints by heat-shrinking exhibits the additional drawback that the joint must be cooled to room temperature before the pump assembly can be put to renewed use, a procedure which normally takes up a period of 6–8 hours. Thus, each inspection of the shaft seal necessitates a very long interruption of operation of the pump assembly.

SUMMARY OF THE INVENTION

An object of the invention is to provide a novel and improved method of rapidly aligning the axes of two or more substantially coaxial rotary members, such as the axes of a motor shaft, a pump shaft and an intermediate shaft in a centrifugal pump assembly for use in nuclear reactor plants.

Another object of the invention is to provide a method of accurately aligning the axes of rotary parts which transmit torque to each other through the medium of face gears.

A further object of the invention is to provide a method of the above outlined character which can be carried out within a small fraction of the time that is needed to assemble and true a joint between two coaxial rotary parts in accordance with presently known proposals.

An additional object of the invention is to provide a novel and improved connection between coaxial rotary members which allows for rapid and convenient alignment of the axes of such members in the event that the axis of one member is not in exact alignment with the axis of the other member, particularly when the axis of one member is tilted with respect to the axis of the other member.

One feature of the invention resides in the provision of a method of changing the inclination of axes of two substantially coaxial rotary members or parts which have mating face gears and at least one of which has an annular control surface which is located in a plane extending at right angles to the respective axis. The method comprises the steps of urging the face gears into mesh with each other including subjecting circumferentially spaced portions of the face gears to the action of adjustable forces acting in directions which are substantially parallel to the axes of the parts, monitoring the inclination of the plane of the control surface with respect to the axis of the other part, and adjusting the magnitude of selected forces to thereby change the inclination of at least one of the axes when the plane of the control surface is not normal to the axis of the other part until the two axes are accurately aligned with each other. The steps of subjecting circumferentially spaced portions of the face gears and of adjusting the magnitude of the forces may include elastically deforming the teeth of the face gears.

If each of the two parts has an annular control surface which is normal to the respective axis, the monitoring step may comprise determining the inclination of the planes of the two control surfaces with respect to each other and the adjusting step then comprises changing the magnitude of selected forces when the planes are not parallel to each other, i.e., the changing step is performed until the two planes are parallel to each other which is indicative of exact coaxiality of the two parts.

The method can be carried out without rotating the parts. Thus, the monitoring step may comprise measuring the distance between the two control surfaces at several points spaced circumferentially around the axes of the two parts, and the adjusting step then comprises changing the magnitude of selected forces until the measured distance is the same at each point.

The novel features which are considered as characteristic of the invention are set forth in particular in the appended claims. The improved pump assembly itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
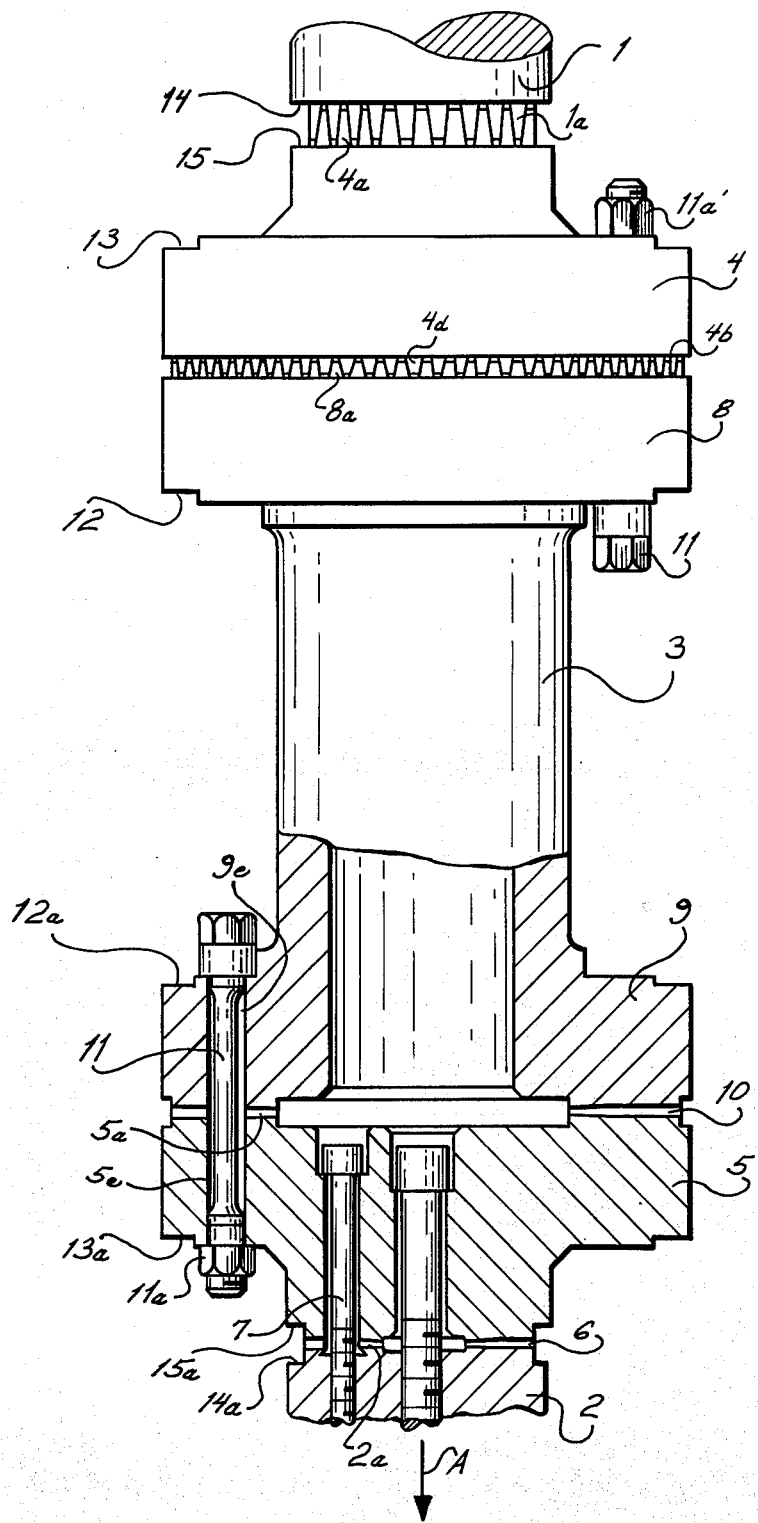
FIG. 1 is a partly elevational and partly axial sectional view of a pump assembly wherein the axes of three shafts can be aligned in accordance with one embodiment of the invention.

FIG. 1 shows a portion of a centrifugal pump assembly wherein the output shaft or drive shaft 1 of an electric motor transmits torque to a second (driven) shaft 2 which rotates the impeller (not shown) of a centrifugal pump. The means for transmitting torque from the shaft 1 to the shaft 2 comprises a removable hollow intermediate shaft 3 which can be placed in a position of exact axial alignment with the shafts 1 and 2 in accordance with the present invention.

The drive shaft 1 has a lower end face or control surface 14 formed with an annulus of radially extending teeth which constitute a face gear 1a in mesh with a complementary face gear 4a whose teeth extend upwardly from the upper end face or control surface 15 of a flange 4. The lower end face 4b of the flange 4 is formed with a larger face gear 4d in mesh with a complementary face gear 8a formed on the upper end face of a flange 8 constituting the upper end portion of the intermediate shaft 3. The upper portion of the flange 4 is formed with an annular control surface 13, and the lower end portion of the flange 8 is formed with an annular control surface 12. The planes of the surfaces 13, 12 are exactly normal to the axes of the respective flanges, and the planes of the control surfaces 14, 15 are respectively normal to the axes of the shaft 1 and flange 4.

The lower end portion 9 of the intermediate shaft 3 constitutes a further flange having at its upper side an annular control surface 12a and a lower end face formed with a face gear 10 in mesh with a complementary face gear 5a extending upwardly from the upper face of a fourth flange 5. The lower portion of the flange 5 has an annular control surface 13a and its lower end face has a face gear 6 in mesh with a face gear 2a extending upwardly from the upper end face of the driven shaft 2. The flange 5 has a second control surface 15a adjacent to a control surface 14a of the driven shaft 2. The latter is rigidly connected with the flange 5 by one or more threaded bolts 7 or analogous fasteners.

The flanges 5, 9 have registering bores 5e, 9e for the shanks of bolts 11 meshing with nuts 11a. The drawing merely shows a single bolt 11 but the coupling between the shafts 1 and 2 comprises several bolts 11 which may but need not be equally spaced from each other, as considered in the circumferential direction of the flanges 5 and 9. The bores 5e, 9e are parallel to the axes of the respective flanges. Similar bolts 11' (mating with nuts 11a') extend through registering bores (not shown) in the flanges 4 and 8.

When the intermediate shaft 3 is to be removed, the bolts 11 and 11' are removed in the first step so that the flanges 8, 9 are respectively detached from the flanges 4, 5. The entire centrifugal pump (including the parts 2, 5 and 7) then descends in the direction indicated by arrow A through a distance which suffices to move the teeth of the face gear 5a of the flange 5 out of mesh with the teeth of the face gear 10 and to move the face gear 8a or 4a out of mesh with the face gear 4d or 1a. The flange 4 is preferably secured to the shaft 1 by fastener means similar to the bolts 7 so that the flange 4 remains attached to the shaft 1 when the intermediate shaft 3 is removed.

When the shaft 3 is reinserted between the shafts 1, 2 and the flanges 8, 9 are respectively connected with the flanges 4, 5 by means of bolts 11, 11' and nuts 11a, 11a', the axis of the shaft 3 is moved into exact alignment with the common axis of the shafts 1, 2 in the following way: The operator moves the tip of a micrometer caliper or an analogous measuring instrument (not shown) into contact with the control surface 12 or 12a while the intermediate shaft 3 need not rotate whereby the instrument indicates whether or not the axis of the flange 8 or 9 is inclined with respect to the axis of the flange 4 or 5. In the event of improper inclination i.e., in the event of the absence of exact axial alignment), selected bolts and nuts 11, 11a or 11', 11a' are loosened or tightened to effect a more or less pronounced elastic deformation of the teeth of face gears 4d, 8a or 5a, 10. All of the gear teeth are preferably machined and finished with the utmost precision including lapping and analogous treatments.

The flanges 4, 5 can be moved into exact axial alignment with the respective shafts 1, 2 in a similar way, i.e., by tightening or loosening selected bolts 7 between 1, 4 or 2, 5 to effect a more or less pronounced elastic deformation of the teeth which form part of face gears 1a, 4a, or 2a, 6.

The bolts 7 between the shafts 1, 2 and the respective flanges 4, 5 are preferably distributed at equal intervals about the axes of these shafts. During alignment of flanges 4, 5 with the shafts 1, 2 (or vice versa), the measuring instrument is caused to measure the distance between the control surfaces 14, 15 or 14a, 15a. The exact nature of the measuring instrument(s) which can be used to determine the inclination of control surfaces, 12, 13, 14, 15, 12a, 13a, 14a, 15a with respect to the axis of the shaft 1 forms no part of the invention. The planes of the control surfaces 12, 13 or 12a, 13a, are monitored in order to adjust the bolts 11' or 11 and hence the alignment of flanges 4, 8 or 5, 9. The planes of surfaces 14, 15 or 14a, 15a are scanned in order to adjust the alignment of flanges 4, 5 with the respective shafts 1, 2. The forces which are produced by the bolts 7 and bolts and nuts 11, 11a and 11', 11a' are substantially parallel to the axes of the shafts 1–3.

Figure 2:
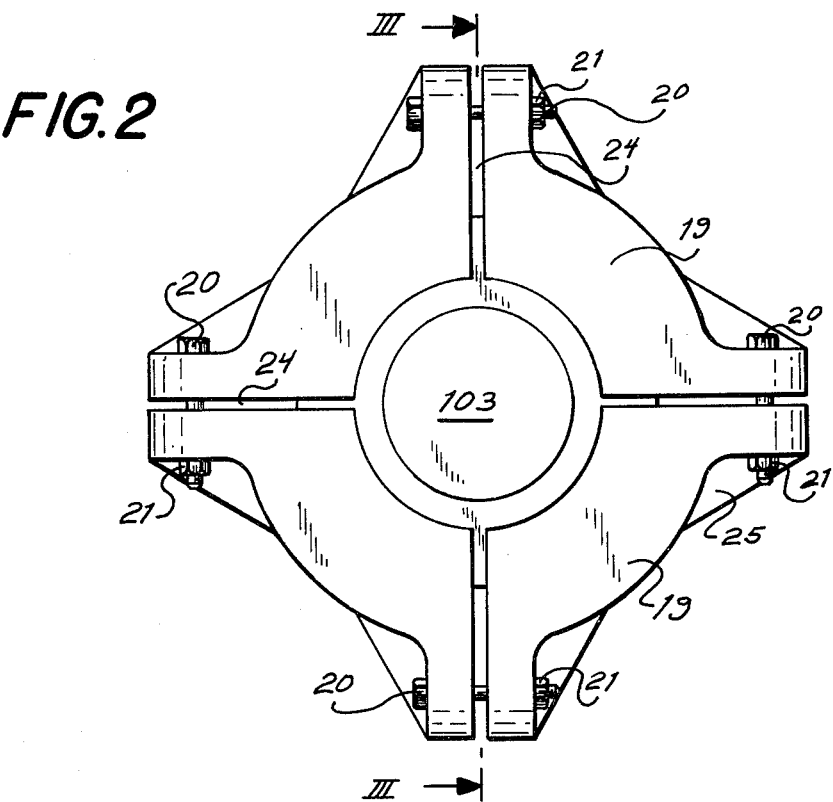
FIG. 2 is an end elevational view of a portion of a second assembly.
Figure 3:
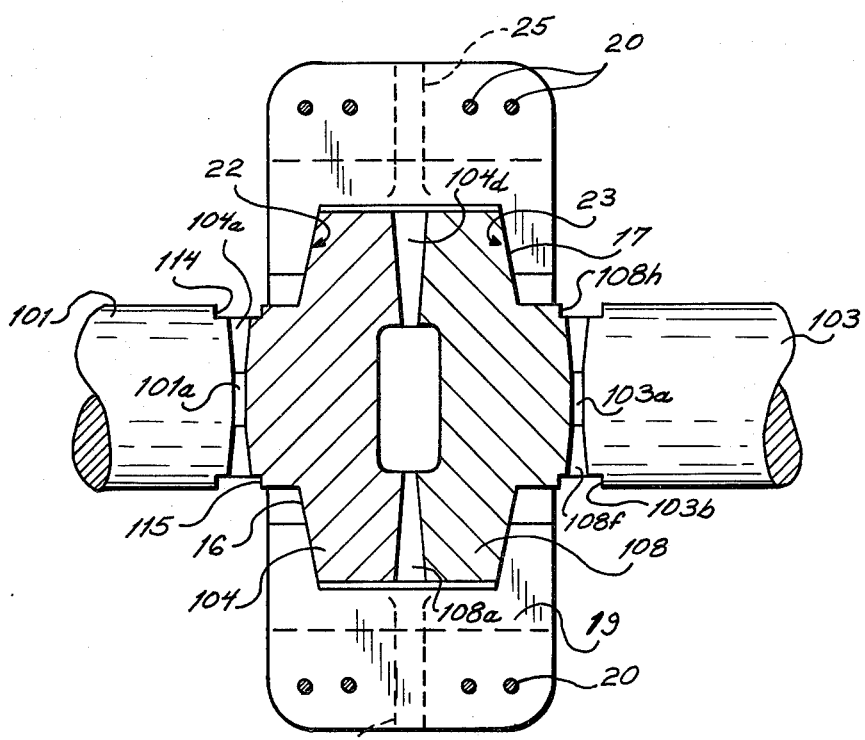
FIG. 3 is a sectional view as seen in the direction of arrows from the line III—III of FIG. 2.

It will be noted that, in FIG. 1, the gears 1a, 4a, 4d, 8a, 5a, 10, 2a, 6 are face gears and the adjusting elements 7, 11, 11' which are used to elastically deform selected teeth of selected face gears are substantially parallel to the axes of the shafts 1, 2 and 3. The holes or bores for the elements 7, 11, 11' extend through the respective pairs of gears. FIGS. 2 and 3 show a second embodiment wherein the axes of the adjusting elements 20 are normal to and cross in space with the axes of the shafts.

The shaft 101 of FIG. 3 corresponds to the shaft 1 of FIG. 1 and the shaft 103 corresponds to the intermediate shaft 3. The shaft 101 has an annular control surface 114 and a face gear 101a in mesh with a face gear 104a of a flange 104. The latter further comprises an annular control surface 115 and a larger face gear 104d in mesh with the complementary face gear 108a of a second flange 108. The flange 108 is formed with a second face gear 108f in mesh with a face gear 103a of the intermediate shaft 103 and has a control surface 108h adjacent to a control surface 103b of the shaft 103.

The flanges 104, 108 have tapering surfaces 16, 17 which slope radially outwardly toward their peripheral surfaces in directions from the face gears 104a, 108f toward the face gears 104d, 108a.

The flanges 104, 108 are surrounded by a composite four-piece clamp having sections 19 held together by the aforementioned adjusting elements 20 each of which constitutes a bolt in mesh with a nut 21. The sections 19 of the clamp have inclined internal surfaces 22, 23 which respectively abut against portions of the surfaces 16, 17. The distance between and the inclinations of internal surfaces 22, 23 in each section 19 are selected in such a way that the neighboring sections 19 define radially extending clearances or gaps 24. By changing the width of selected gaps 24 in response to rotation of nuts 21 with respect to the corresponding bolts 20 and/or vice versa, the operator can change the inclination of the axis of the flange 108 with respect to the axis of the flange 104 and/or vice versa until the axes of the flanges are accurately aligned with each other and with the axes of the shafts 101, 103. The measuring instrument monitors the inclination of the control surfaces 114, 115 or 103b, 108h with respect to each other. By changing the width of selected gaps 24, the operator can also change the inclination of the flange 104 or 108 with respect to the shaft 101 or 103. The other end portion of the shaft 103 can be coupled to a driven shaft (corresponding to the shaft 2 of FIG. 1) by a structure which is analogous to or identical with that shown in FIGS. 2–3.

The sections 19 may be provided with stiffening ribs 25. FIG. 2 shows that the neighboring sections 19 are connected to each other by sets of four bolts 20 and nuts 21. The number of such bolts and nuts can be reduced to one, two or three or increased to five or more. When the width of gaps 24 is changed (i.e., when the measurements with a micrometer caliper or the like indicate that the plane of the control surface 114, 115, 108h or 103b is not exactly normal to the axis of that shaft whose axis is determinative for proper alignment of shafts), the sections 19 change the elastic deformation of selected teeth of the gears 101a, 104a or 104d, 108a and/or 108f, 103a, the same as described in connection with the embodiment of FIG. 1. The face gears shown in FIG. 3 are preferably machined and finished with a very high degree of precision so that they automatically insure that the parts 101, 104, 108, 103 are not laterally offset with respect to each other, i.e., that the only possible defect is a minor misalignment (inclination) of the axes of parts 101, 104, 108, 103 with respect to each other. This also applies for the embodiment of FIG. 1. Thus, the adjustments which are effected by means of elements 7, 11, 11' or 20 normally result in the tilting of corresponding axes but need not effect any lateral shifting of the respective rotary members.

It will be seen that, even though the adjusting elements 20 of FIGS. 2 and 3 are tangential to the flanges 104, 108, the variable forces which they produce upon the inclined surfaces 16, 17 of the flanges are parallel or substantially parallel to the axes of the rotary members 101, 103.

An advantage of the improved method and connection is that the axes of neighboring rotary members may be moved into exact alignment with each other while the rotary members are at a standstill. Thus, and referring to FIGS. 2 and 3, it is only necessary to determine the inclination of the planes of the control surfaces 115, 108h with respect to each other by measuring the distance between such planes at several points which are spaced from each other in the circumferential direction of the clamp. If the two planes are not parallel to each other, selected bolts and nuts 20, 21 are tightened or loosened to reduce the elastic deformation of teeth of the corresponding portions of mating face gears 104d, 108a until the two planes are exactly parallel to each other which indicates that the axis of the flange 104 is exactly aligned with the axis of the flange 108. The procedure is analogous when the operator wishes to align the axes of the shaft 101 and flange 104 or the axes of the shaft 103 and flange 108; the measuring instrument or instruments then monitor the inclination of the planes of control surfaces 114, 115 or 108h, 103b with respect to each other. The flanges 104, 108 can be connected to the respective shafts 101, 103 by adjusting elements similar to the bolts 7 of FIG. 1.

The alignment is affected by taking advantage of elastic deformability of gear teeth and by changing the elastic deformation of selected teeth or groups of teeth, as considered in the circumferential direction of the rotary members. This contrasts the procedure in connection with the alignment of rotary members in conventional pump assemblies wherein the rotary members have mating face gears but the parts which maintain the gears in mesh are not adjustable for the purpose of bringing the axes of neighboring rotary members into accurate alignment with each other.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a pump assembly, particularly in a centrifugal pump assembly for use in nuclear reactor plants, a combination comprising a first rotary member having a first face gear at one end thereof; a second rotary member having a second face gear at one end thereof, said face gears being normally in mesh with each other and at least one of said rotary members having an annular control surface located in a plane which is normal to the axis of said one rotary member so that a monitoring of said control surface can detect eventual deviations of the axis of said one rotary member from a position of accurate alignment with the axis of the other rotary member; and means for changing the inclination of at least one of said rotary members with respect to the other rotary member upon detection of said deviations, including a plurality of adjusting elements spaced apart from each other in the circumferential direction of said rotary members and each urging different portions of said face gears into mesh with each other with a force which is variable to allow for tilting of at least one of said rotary members with respect to the other rotary member upon detection of said deviations until the axes of said rotary members are accurately aligned with each other so that the plane of said control surface is normal to the axes of both rotary members.

2. An assembly as defined in claim 1, wherein each of said members has a control surface disposed in a plane which is normal to the respective axis.

3. An assembly as defined in claim 1, wherein said one member comprises a flange, the face gear of said one member being provided at one end of said flange and said control surface being provided at the other end of said flange.

4. An assembly as defined in claim 1, wherein said ajusting elements are threaded elements extending in substantial parallelism with said axes.

5. An assembly as defined in claim 4, wherein said elements extend through holes provided in said members and passing through said face gears.

6. An assembly as defined in claim 1, wherein each of said members comprises a flange and said face gears are provided on said flanges, said flanges having tapering substantially radially extending surfaces remote from the respective gears and said inclination changing means comprising a clamp having a plurality of sections each having a pair of internal surfaces engaging portions of said tapering surfaces, said elements extending substantially tangentially of said flanges and coupling the neighboring sections of said clamp to each other.

7. An assembly as defined in claim 6, wherein said neighboring sections define gaps whose width is variable by said adjusting elements.

8. A method of changing the inclination of axes of two substantially coaxial rotary members each of which has a flange substantially perpendicular to the axis of its rotation comprising the steps of: providing on each of said flanges an annular peripheral control surface normal to the axis of rotation thereof and accessible from outside; monitoring the inclination of the plane of one control surface with respect to the axis of the other rotary member; urging the flanges into correct interrelationship and thereby the face gears into mesh with each other including subjecting circumferentially spaced plural areas of the flanges having said face gears by the action of adjustable forces acting in directions which are substantially parallel to the axes of the rotary members and adjusting the magnitude of the selected forces to thereby change, when and where need is, the inclination of at least one of said axes when the plane of the control surface is not normal to the axis of the other rotary member until the axes of the rotary members are accurately aligned with each other.

9. A method as defined in claim 8, wherein said step of subjecting circumferentially spaced plural areas of said annular control surface to the action of adjustable forces includes elastically deforming the teeth of the mating face gears.

10. A method as defined in claim 8, wherein said monitoring step comprises measuring the inclination of the planes of said annular control surfaces with respect to each other and said adjusting step comprises changing the magnitude of selected forces on appropriate peripheral areas when said planes are not parallel to each other.

* * * * *